United States Patent [19]

Niles et al.

[11] Patent Number: 5,943,679
[45] Date of Patent: Aug. 24, 1999

[54] MULTI-PAGE DOCUMENT VIEWER HAVING A FOCUS IMAGE AND RECURSIVELY NESTED IMAGES OF VARYING RESOLUTIONS LESS THAN THE RESOLUTION OF THE FOCUS IMAGE

[75] Inventors: Leslie T. Niles; Dan S. Bloomberg, both of Palo Alto, Calif.

[73] Assignee: Xerox Corporation, Stamford, Conn.

[21] Appl. No.: 08/741,072

[22] Filed: Oct. 30, 1996

[51] Int. Cl.$^6$ .................................................... G06F 17/00
[52] U.S. Cl. ........................................... 707/526; 707/514
[58] Field of Search .................................. 707/526, 514; 345/439, 127

[56] References Cited

U.S. PATENT DOCUMENTS

| | | | |
|---|---|---|---|
| 4,823,303 | 4/1989 | Terasawa | 345/127 |
| 5,199,102 | 3/1993 | Sakuragi | 345/439 |
| 5,212,568 | 5/1993 | Graves et al. | 358/474 |
| 5,341,466 | 8/1994 | Perlin et al. | 345/439 |
| 5,493,634 | 2/1996 | Bonk et al. | 395/101 |
| 5,499,330 | 3/1996 | Lucas et al. | 707/514 |
| 5,598,524 | 1/1997 | Johnston, Jr. et al. | 345/348 |
| 5,670,984 | 9/1997 | Robertson et al. | 345/127 |

OTHER PUBLICATIONS

Williams, Lance. "Pyramidal Parametrics", Computer Graphics, vol. 17, No. 3, published by Association for Computing Machinery, pp. 1–11, Jul. 1983.
Robertson et al., "The Document Lens," UIST, Nov. 1993, pp. 101–109.
Rao et al., "Protofoil: Storing and Finding the Information Worker's Paper Documents in an Electronic File Cabinet," Proc. SGCHI, 1994, Boston Mass.
Mackinlay et al., "Developing Calendar Visualizers for the Information Visualizer," Proc. UIST, 1994.
Sarkar et al., "Graphical Fisheye Views," Communication of the ACM, Dec. 1994, vol. 37, No. 12, pp. 73–83.
Microsoft Word User's Guide, Version 6.0, "Previewing a Document Before Printing,", Part 6, File Management, pp. 528–531, Jan. 1994.
Robertson et al., "Information Visualization Using 3D Interactive Animation," Communications of the ACM, Apr. 1993, vol. 36, No. 4, pp. 57–71.

(List continued on next page.)

*Primary Examiner*—Mark R. Powell
*Assistant Examiner*—Jeffrey Allen Rossi

[57] ABSTRACT

A document display system arranges images of a document ordered in a linear array of pages on a display screen. One page of the document is defined as a focus page which is displayed at the center of the display screen. Images of pages preceding the focus page in the linear array of pages are presented to a user using a first recursive block that is located to the left of the focus page on the display screen. Images of pages following the focus page in the linear array of pages are presented to a user using a second recursive block that is located to the right of the focus page on the display screen. Each recursive block is initially filled with images that are arranged proximate to the focus page in the array of pages. This arrangement of the pages of a document on the display screen provides a context within which to view the selected focus page of a document. In addition, this arrangement of pages provides a method for traversing pages of a document to enable a user to quickly locate and bring a certain page into focus. A user traverses pages of the document by selecting one of the displayed pages on the display screen to be a new focus page. In response to the selection of a new focus page, the document display system locates the new focus page in the linear array of pages, and brings the new focus page to the center of the display while shuffling the other pages of the document to predefined sizes and locations.

21 Claims, 10 Drawing Sheets

OTHER PUBLICATIONS

Spence et al., "Data base navigation: an office environment for the professional," Behavior and Information Technology, 1982, vol. 1, No. 1, pp. 43–54.

Leung et al., "A Review and Taxonomy of Distortion–Oriented Presentation Techniques," ACM Transactions on Computer–Human Interaction, vol. 1, No. 2, Jun. 1994, pp. 126–160.

Johnson et al., "Tree–Maps: A Space–Filling Approach to the Visualization of Hierarchical Information Structures," IEEE Computer Society Press, Oct. 22–25, 1991, pp. 284–291.

Lars Erik Holmquist, "Flip Zooming: An Alternative to Distortion–Based Focus+Context Views," Master's thesis, Computing Science, Göteborg University, Sep. 12, 1996, website http://www.ling.gu.se/nleh/exjobb/.

Coward, R.E., "Area Mapping Table Look Up Scheme," Xerox Disclosure Journal, vol. 18, No. 2, Mar./Apr. 1993, p. 217.

Papaconstantinou, P., "Hardware Architecture for Resolution Conversion Using Area Mapping," Xerox Disclosure Journal, vol. 18, No. 5, Sep./Oct. 1993, p. 553.

MULTI-PAGE DOCUMENT VIEWER HAVING A FOCUS IMAGE AND RECURSIVELY NESTED IMAGES OF VARYING RESOLUTIONS LESS THAN THE RESOLUTION OF THE FOCUS IMAGE

The present invention relates generally to the visual display of information, and more particularly to a method and apparatus for viewing multiple pages of a document on a display screen at various resolutions in a recursive layout pattern.

BACKGROUND OF THE INVENTION

A document is defined herein as any collection of pages, electronic or hardcopy, that taken together form a work. When reading a document, the details of a page should be legible within the context of the document. This context of a page within a document can be both hierarchical, such as the chapters, sections, and subsections of a book, and linear, such as the sequence of pages defining a chapter within the book. Often the ability to perceive the context of a document is as important as the ability to read the words forming the document.

Bound hardcopy documents, produced for example using paper, provide linear context to a reader because of the spatial position of a page relative to the other pages of the bound document. For example, readers know that they are approaching the end of a bound document by perceiving that the current page is a certain fraction of the way through the bound document. In contrast, electronic documents displayed using a computer display tend to display one page of the document at a time. Horizontal and vertical scroll bars are positioned to the side and bottom of the displayed page to indicate the vertical and horizontal location of the page relative to the rest of the document. This contextual information, however, provides limited position information because the area of the scroll bar tends to be fixed.

Even with this contextual disadvantage there exist, however, many advantages to recording and reading documents in an electronic form rather than in a hardcopy form. Storing documents, for example, in an electronic form is physically more dense than hard copy storage. Also, operations such as filing, copying, searching, and retrieving of stored electronic files can be performed more efficiently than for documents in a hardcopy form. Because of these and other advantages, the number of electronic documents available on-line over computer networks is increasing rapidly. These electronic documents are either documents that are originally created in an electronic form or converted from hardcopy documents.

Even though documents in an electronic form have a computational advantage over documents in a hardcopy form (e.g. filing, storing, copying, searching, etc.), hardcopy continues to be the preferred form in which to read documents because of its desirable attributes that have not been duplicated by electronic document viewers. Continuing research and development efforts attempt to improve the resolution, contrast, and power consumption of displays. Also, research and development efforts have attempted to enhance the functionality of displays by improving the manner in which electronic documents are presented to a reader.

Most display systems represent the pages of electronic documents on a display screen in a two-dimensional layout. The problem with the two-dimensional layout is that often a user must choose between viewing detail or viewing context. More specifically, a user must often choose between viewing an unreadable global image showing the context of a document and readable details that show a single page of the document without context. This trade off exists because display screens do not have a large enough area to capture an entire document in two dimensions with the requisite resolution for the document to be legible.

Other display systems represent pages of electronic documents as a three-dimensional layout projected onto the two dimensions of a display screen. This three-dimensional functionality enhances the manner in which electronic documents are presented to viewers by utilizing their experience and intuition of viewing and manipulating real objects. For example, Robertson et al. in "The Document Lens," Proc. UIST, Nov. 1993, pages 101–109, discloses a screen visualization technique that uses a physical perspective metaphor of a magnifying lens that is dragged over a two-dimensional layout of a document on a display screen. More specifically, the screen visualization technique disclosed by Robertson et al. provides a central area, which contains approximately one page of a document that is surrounded by pages in the two-dimensional layout. Pages of the document that do not fit within the central area fall away in a perspective view, as if they were seen through a fisheye lens. A fisheye lens shows an area of interest in an image quite large and with detail relative to other areas in the image that are shown with less detail.

Although the fisheye screen visualization technique used by Robertson et al. is a good technique for displaying pages of a document in two dimensions, the technique tends to display pages on the screen in a random ordering. For example, half of the context provided by the document lens is in rows of pages above and below the page in the central area. The relationship between pages above and below the central page does not provide any information relative to the context of the page in the central area with respect to the document as a whole. In addition, the use of the physical perspective metaphor tends to display pages in a perspective view that greatly reduces the legibility of a page. Furthermore, producing perspective views requires significant computational resources that many display systems may not readily support.

Distortion caused by perspective projection of images surrounding the central area, however, can be avoided if "more distant" views of surrounding pages are represented by reduced size, flat projection images, that are known in the art as "thumbnails." Such thumbnails are used as a visual index into documents, or collections of documents. For example, Rao et al. in "Protofoil: Storing and Finding the Information Worker's Paper Documents in an Electronic File Cabinet," Proc. SGCHI, 1994, Boston Mass., discloses an electronic filing system that uses thumbnails for identifying characteristics of hardcopy documents stored as electronic images. More specifically, Rao et al. disclose a screen visualization technique that displays a large-size page alongside thumbnails of a number of other pages that can be selected for display as a large-size page. The use of thumbnails, however, requires a trade off between size and content: smaller thumbnails allow more pages of a document to be displayed on a fixed area of a screen, while larger thumbnails present a larger amount of information in each thumbnail but take up more of the display screen.

Improved user interfaces have been developed that permit multiple resolution levels to be displayed on a screen at once. These improved user interfaces provide a natural way to display documents or information that are hierarchical in nature. For example, Mackinlay et al. in "Developing Calendar Visualizers for the Information Visualizer," Proc. UIST, 1994, disclose different ways to visualize access to large masses of time-based information. These visualization techniques show, on a display screen, progressive amounts of detail of the time-based information that extends from a single appointment on a day, to that day's list of appointments, to that week's schedule of marked busy times, to that month's calendar, and finally to that year's calendar. An entire millennium, therefore, could be displayed and navigated using this visualization technique.

Many documents, however, do not have an extensive hierarchical structure and therefore do not require enhanced three-dimensional visualization techniques to obtain the context of a page within a document. For example, some hardcopy documents lose their hierarchical structures when they are recorded electronically using a scanning system. Document viewers that present documents on a display screen as a linear array of pages such as the Microsoft® Word® word processor permit multiple pages to be displayed on a display screen at a uniform resolution. The uniform resolution selected to display the pages varies depending on the number of pages displayed on the screen at once. However, pages that are illegibly displayed on the screen can be selected and zoomed into at an increased resolution.

The limitations of the visualization techniques described above include limitations that concern machine performance, display resolution, and document context. These visualization techniques tend to trade off context of a page within a document for the resolution at which the document is displayed. Accordingly, it would be desirable to provide a method for visualizing linear arrays of pages of a document on a display screen that overcomes some of the limitations and disadvantages of the document visualization techniques described above. Specifically, it would be advantageous if the improved visualization technique displayed a "focus page" (or "focus image") at a legible resolution while displaying legible content of the other pages of the document. It would also be advantageous if the display of the pages can be used to navigate through the document. Furthermore, it would be advantageous for the improved visualization technique to provide context of the focus page in a manner that does not vary depending on the particular display screen on which the document in being viewed. In addition, it would be advantageous if the improved visualization technique is not computationally intensive.

SUMMARY OF THE INVENTION

In accordance with one aspect of the invention, there is provided a method for processing images of a document with a display system. The display system includes a display screen for presenting images to a user, a user input device for receiving signals indicating commands from the user, memory for storing images of the document in an array, and a processor for receiving commands from the user input device directed at displaying the images of the document stored in the memory on the display screen. Initially, an image of the document in the array is identified that defines a focus image of the document to be displayed on the display screen. Subsequently, a display layout identifying a location and a resolution at which to display the images of the document on the display screen is calculated with the processor. The display layout includes the focus image, a first set of images, and a second set of images. The first set of images and the second set of images have nested sub-sets of images with resolutions that decrease as the position of images in the array of images increases relative to the focus image. Finally, images in the array are displayed on the display screen in accordance with the display layout.

In accordance with another aspect of the invention, there is provided a method for processing documents for display on a screen. The method includes the steps of selecting a document for display from a database of documents stored in a memory, the selected document having a sequence of images; computing a gray scale image for each image in the sequence of images; defining a focal image in the sequence of images; displaying on the screen a first gray scale image representing the focal image, the first gray scale image being displayed at a first resolution; displaying on the screen a second gray scale image representing an image immediately following the focal image in the sequence of images, the second gray scale image being displayed at a second resolution, where the second resolution is less than the first resolution; and displaying on the screen nested sub-sets of images representing images in the sequence of images immediately following the second gray scale image, the nested sub-sets of images being displayed at resolutions less than the second resolution.

In accordance with yet another aspect of the invention, there is provided an apparatus for viewing multiple images of a document on a display screen. A user input device provides a user signal. The user signal identifies an image of the document positioned in an array of images that defines a focus image of the document to be displayed on the screen. A display layout calculator calculates a display layout that identifies a location and a resolution at which to display each image of the document. The display layout includes the focus image, a first set of images, and a second set of images. The first set of images and the second set of images have nested sub-sets of images with resolutions that decrease as the position of images in the array of images increase relative to the focus image. A processor displays images in the array of images on the display screen in accordance with the display layout.

BRIEF DESCRIPTION OF THE DRAWINGS

These and other aspects of the invention will become apparent from the following description which illustrates a preferred embodiment of the invention read in conjunction with the accompanying drawings wherein the same reference numerals have been applied to like parts and in which.

DETAILED DESCRIPTION

Figure 1:
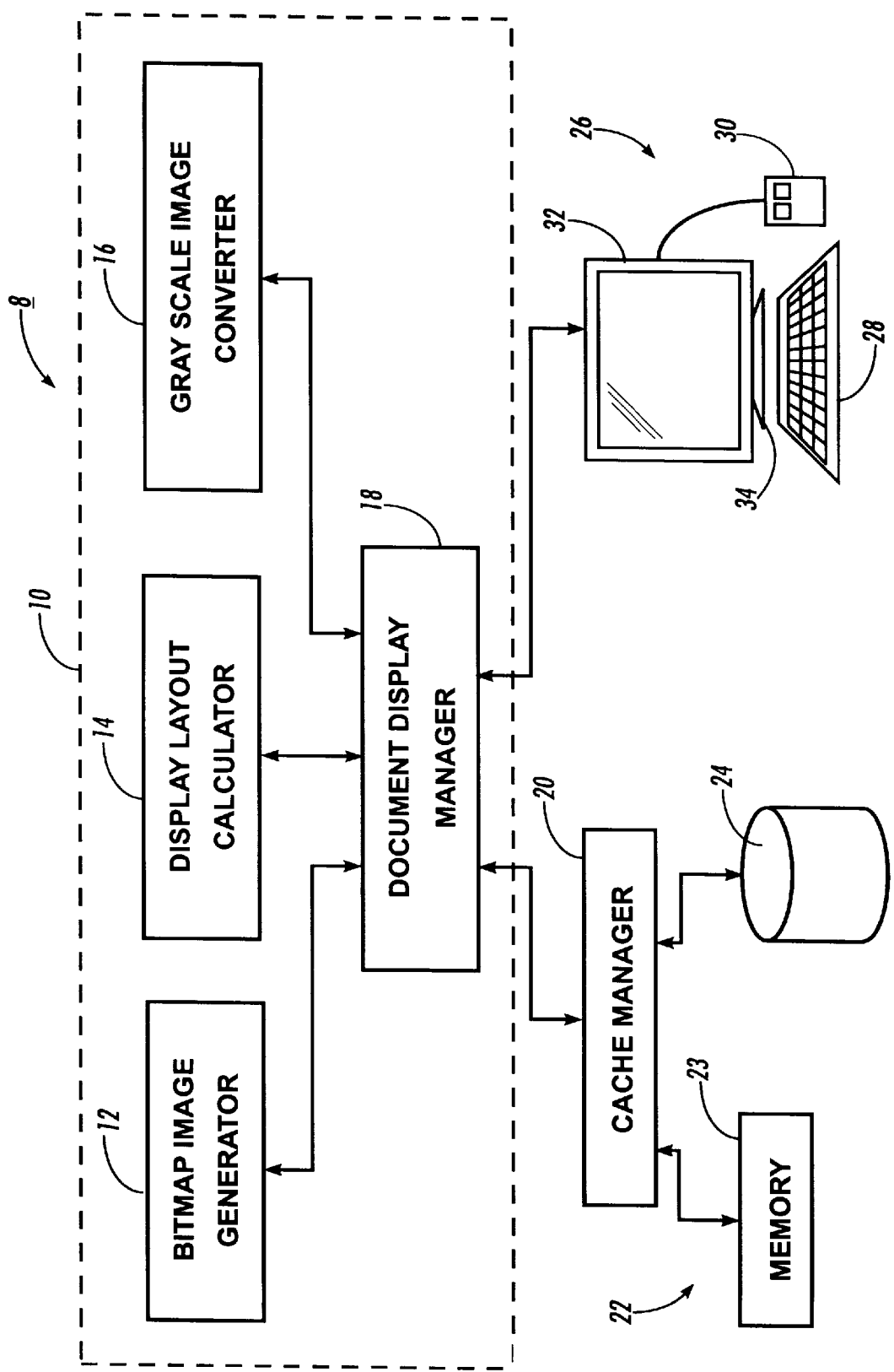
FIG. 1 is a block diagram of a display system incorporating the present invention.

Referring now to the drawings where the showings are for the purpose of describing the preferred embodiment of the invention and not for limiting same, FIG. 1 shows a display system 8 incorporating the present invention which is adapted to display an electronic document having multiple pages. The display system includes a computer system 26, such as a computer workstation, for storing and processing the electronic documents for display to a user. The computer system 26 is associated with a memory 22, and includes a display screen 32, a mouse 30, a keyboard 28, and a processor 34. FIG. 1 shows the computer system 26 operating with RAM memory 23 and hard disk memory 24. The memory 22 may, however, include flash memory, floppy disk, or another form of optical or magnetic storage. The hard disk 24 provides long term storage for storing electronic documents in a digital library, or the like. In addition, hard disk 24 is used by cache manager 20 to provide sufficient virtual memory to load a large number of images in RAM memory 23 for processing and display. The display screen 32 is used to present electronic images to a user. The mouse 30 and keyboard 28 are input devices of the computer system 26 that receive signals indicating commands from a user. The processor 34 receives the commands from the input devices and displays images of documents on the display screen 32 by invoking operating software.

Operating software 10 that is executed by processor 34 on the display system 8 includes a document display manager 18, a bitmap image generator 12, a display layout calculator 14, and a gray scale image converter 16. In accordance with the invention, the document display manager 18 coordinates the display of images representing electronic documents stored in memory 24 on display screen 32 at a plurality of resolutions. The document display manager 18 directs the gray scale image converter 16 to generate varying resolutions of images for display on screen 32 depending on the electronic document selected using the mouse 30 or keyboard 28. However, before creating multiple resolutions of an image, the document display manager first renders binary images of an electronic document with bitmap image generator 12, and determines the screen layout of a document using display layout calculator 14.

Electronic documents stored in long term storage 24 are selected using a user input device for display on screen 32. Electronic documents can consist of images scanned using a scanning system (not shown) or descriptions of images generated using user application software such as Microsoft® Word® or PowerPoint®. In general, user application software provides descriptions of images defining an electronic document using high level primitives defined by languages such as PostScript®, Interpress™, and HP/PCL. These high level primitives are usually a set of commands that describe various graphic and textual elements forming an image of a page of a document. Electronic documents described using high level primitives are directed as input data to bitmap image generator 12 by document display manager 18. The bitmap image generator 12 reduces an input image defined using high level primitives to lower level primitives such as pixels to form a bitmap image. An example of a bitmap image generator that reduces an image defined using high level primitives to lower level primitives is described in U.S. Pat. No. 5,493,634 to Bonk et al., the disclosure of which is incorporated herein by reference. More specifically, Bonk et al. describes a PDL (page description language) decomposer. The types of operations performed by the PDL decomposer include, among others, binding font calls to bitmap or contour fonts, and converting line art/graphics to lower level primitives.

Generally, selected input images which are stored in the memory 22 of display system 8 and described using a high level description of images are directed by display manager 18 to bitmap image generator 12 for processing. The output from the bitmap image generator 12 is a bitmap image that is defined using pixels that have one of two values. Bitmap images are unlike gray scale images that have pixels which are defined by a plurality of gray levels. Each pixel of an image output by bitmap image generator 12 corresponds to a spot which is subsequently marked using an image output terminal such as an electronic printing system (not shown) to form a reproduction of the input image. Scanned images that define pages forming an electronic document are generally defined as a bitmap image in a compressed TIFF (Tag Image File Format) file format. It will be understood, however, by those skilled in the art that for the purposes of carrying out the invention the scanned images can be defined in any one of a number of file formats such as GIF (Graphic Interchange File Format). Electronic documents that have images defined in such compressed file formats are directed by document display manager 18 to bitmap image generator 12 for decompression before being processed by gray scale image converter 16.

Figure 2:
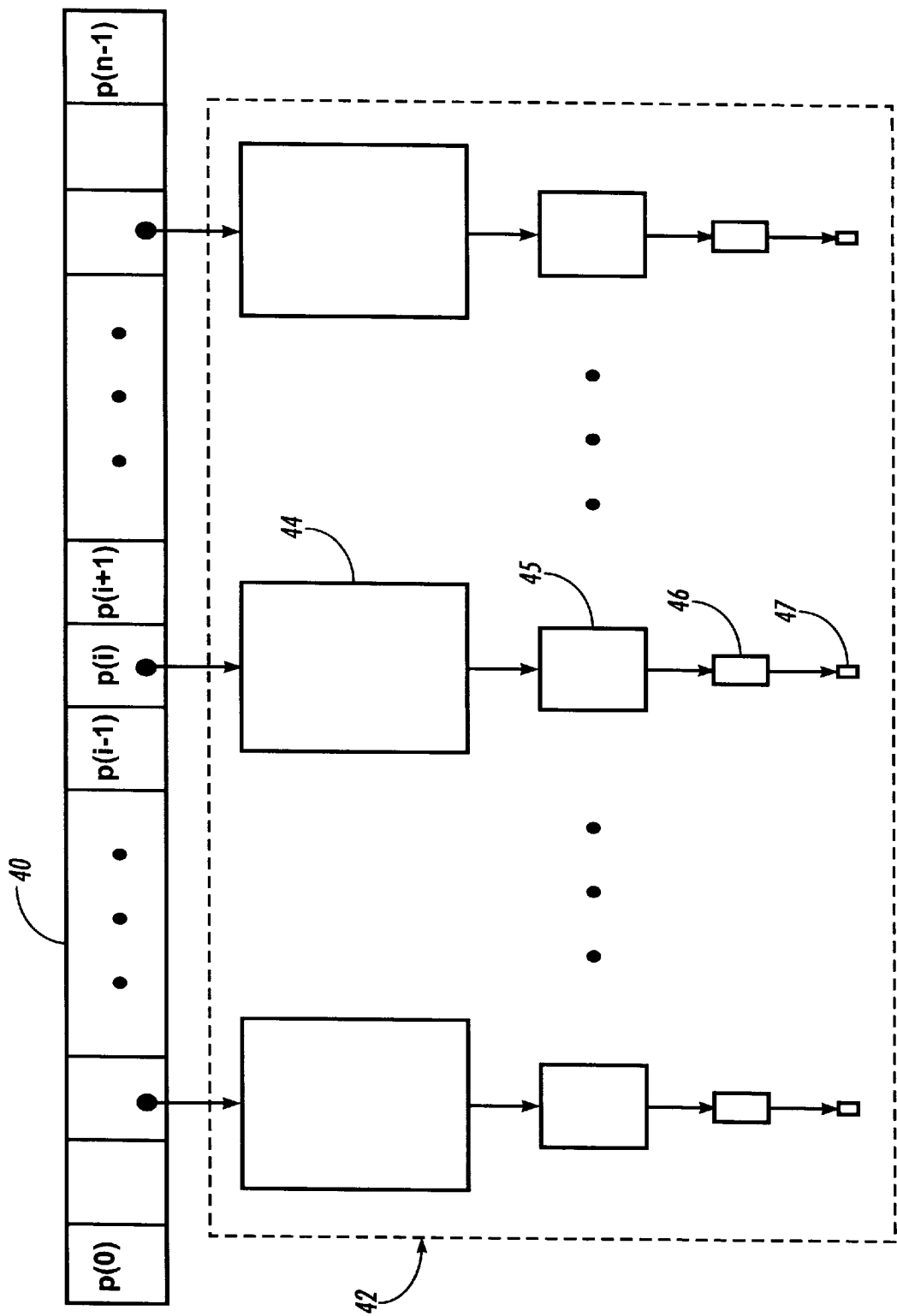
FIG. 2 illustrates a linear array of pages, with each page in the linear array of pages having an array of gray scale images.

Once an electronic document selected for display on screen 32 has been rendered to a binary image, the document display manager 18 arranges the images defining the pages of the electronic document into a linear array 40, which is shown in FIG. 2. The pages of a document are ordered in the linear array 40 from page p(0) to page p(n−1). Each page in the array 40 has associated with it a binary image generated by bitmap image generator 12. In addition to a binary image, each page in the array 40 includes a list of gray scale images that is indicated generally by reference number 42. Each gray scale image 44, 45, 46, and 47, in each list of gray scale images 42 has unique resolution that is derived using gray scale image converter 16. Before directing gray scale image converter 16 to generate gray scale images 4, 45, 46, or 47, display manager 18 invokes display layout calculator 14 to determine a display layout for the screen 32.

The function of display layout calculator 14 is to determine a display layout that will accurately display the pages of a document on display screen 32 in accordance with the present invention. Once invoked by display manager 18, display layout calculator determines a display layout 50 shown in FIG. 3 for presenting an electronic document on a screen 32. Centered in the display layout 50 is a focus page (or focus image) p(i) that is selected by a user with an input device such as mouse 30. The focus page p(i) is one of the (n) pages in the linear array 40 of pages of a document. To the lower left and the upper right of the focus page p(i) are neighboring pages p(i−1) and p(i+1). The neighboring page p(i−1) of focus page p(i) is the page that immediately precedes focus page p(i) in the linear array of pages 40, while the neighboring page p(i+1) is the page that immediately follows focus page p(i) in the linear array of pages 40. These pages p(i−1) and p(i+1) are displayed at one half the resolution (or one half the size in the case of bit halving) of focus page p(i). For the purposes of the present invention a change in resolution is equivalent to a change in size. The remaining pages that either follow or precede focus page p(i) are displayed using two recursive layouts that are indicated generally by reference numbers 51 and 52, respectively.

Each image representing a page of a document displayed on screen 32 is displayed as a flat (i.e. two-dimensional) image at a predetermined size or resolution. At any given time, a user of the display system 8 is assumed to be primarily interested in a particular page, which is defined herein as the focus page p(i). The focus page p(i) is displayed at the maximum or near the maximum resolution possible for a particular display screen 32. The reduced sized images surrounding the focus page p(i) provide a context of the selected document within which the focus page is viewed on the display screeresol The resolution or size of the reduced sized images surrounding the focus page p(i) smoothly decreases as the distance diverges from the focus page p(i). In other words, the pages closer to the focus page p(i) in the array of pages 40 are displayed at a higher resolution than the pages that are further from the focus page p(i). This fading of detail provides a cognitive perspective that avoids distortion inherent in simulating a physical perspective.

Figure 3:
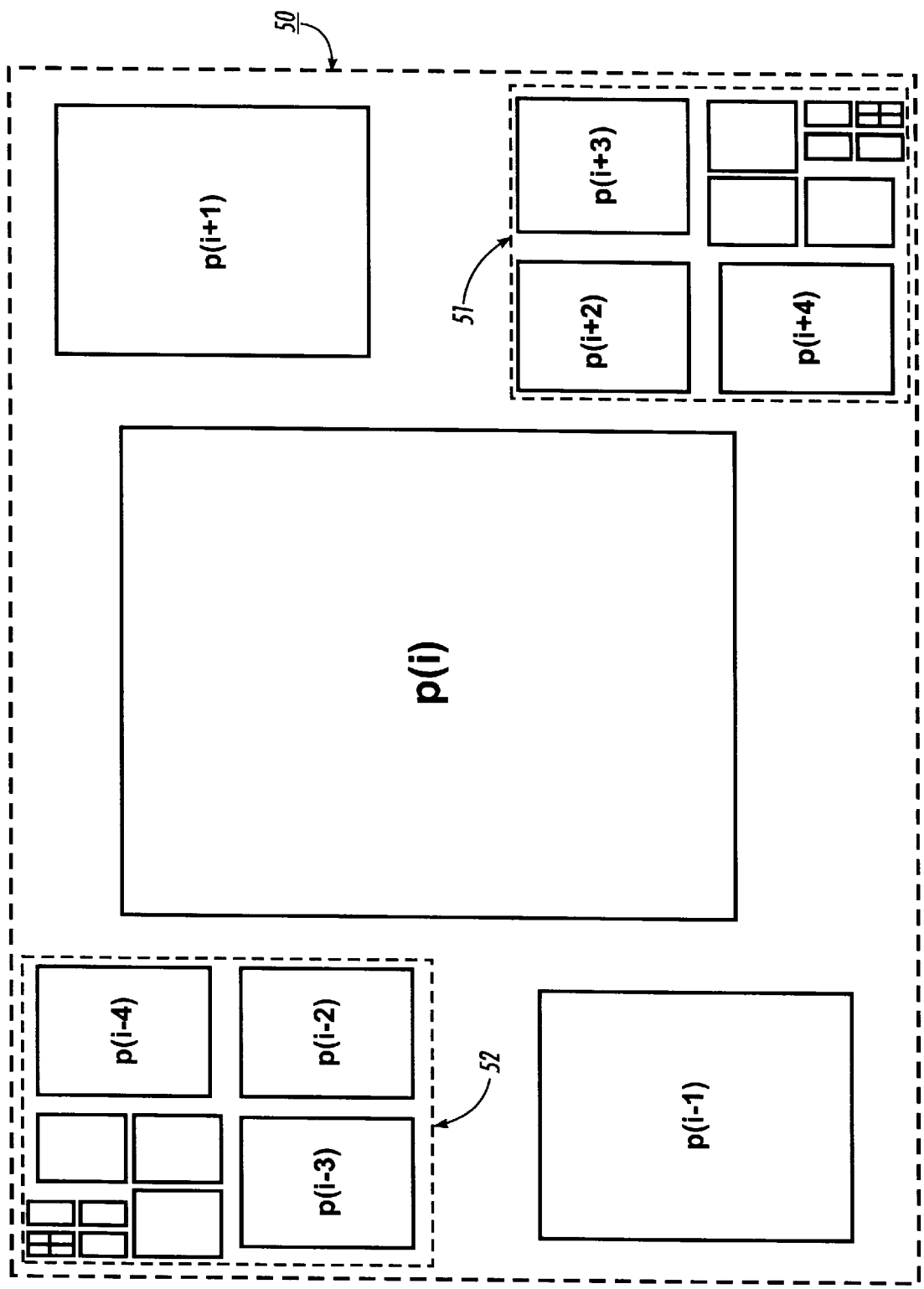
FIG. 3 illustrates a display screen layout calculated by the display calculator shown in FIG. 1.
Figure 4:
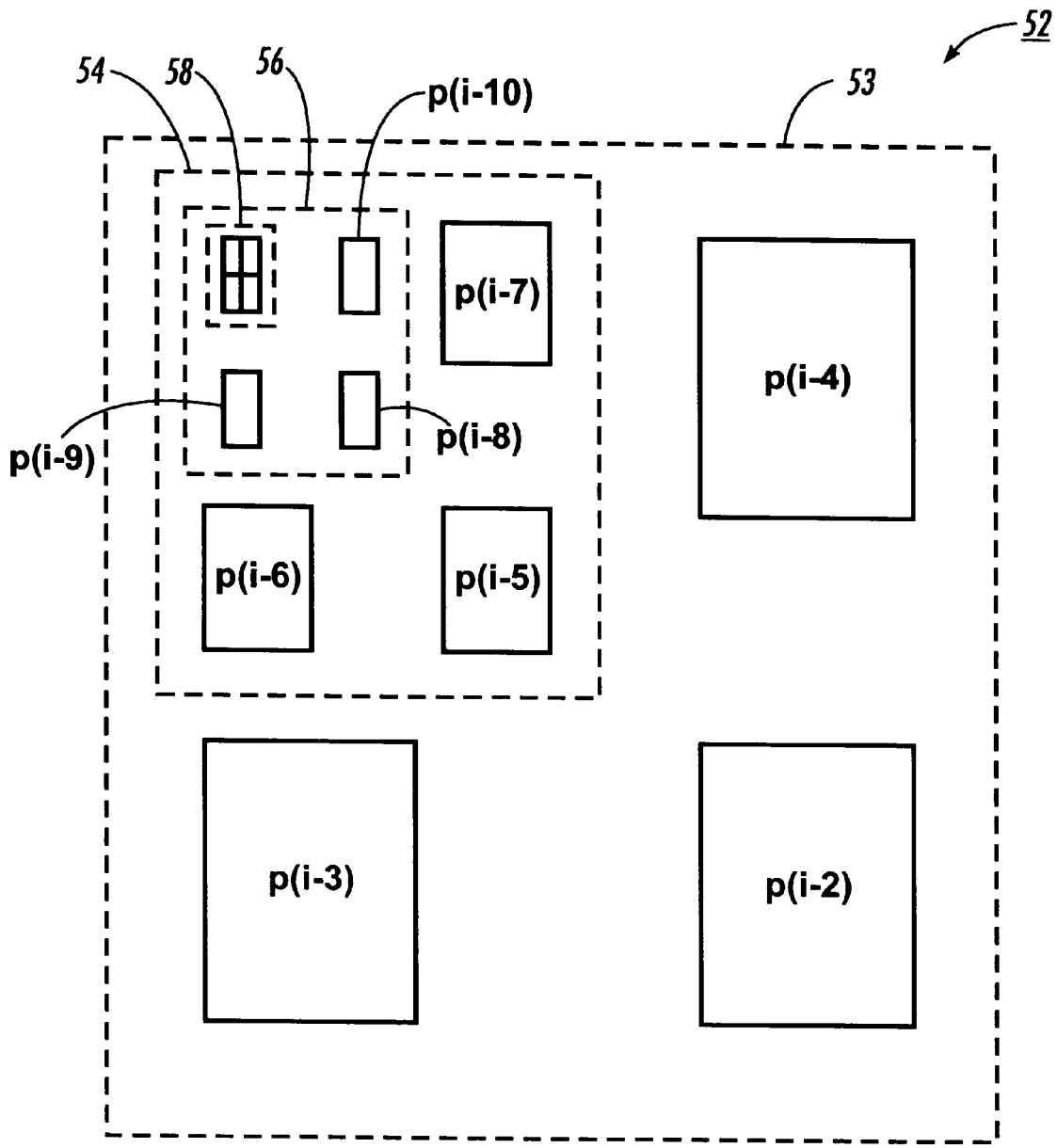
FIG. 4 illustrates the recursive layout in detail for the pages preceding the focus page p(i) shown in FIG. 3.

FIG. 4 shows recursive layout 52 shown in FIG. 3 in greater detail. The recursive layout 51 is analogous to the recursive layout 52 except that the layout is flipped along the diagonal or rotated 180°. More specifically, recursive layout 52 arranges a linear array of pages defining a document in a recursive pattern that does not limit the number of pages that are displayed. In addition, the recursive pattern provides an intuitive and easy-to-navigate page ordering. The recursive layout 52 is a recursive layout pattern that uses several nested sub-blocks. For example, the nested sub-block 53 has four regions one of which is a nested sub-block 54. The nested sub-blocks continue recursively in each sub-block until the sub-blocks are no longer recognizable on the display screen 32. In FIG. 4, the recursive layout 52 begins with sub-block 53 and continues with recursive sub-blocks 54, 56, and 58. It will be understood, however, by those skilled in the art that the recursive layouts 51 and 52 of images shown in the display layout 50 is not limited to the 2x2 geometrical block pattern shown in FIG. 3. In other embodiments, the geometrical block pattern in the recursive layout 52 may contain 3x3, 4x4, 5x5, etc. block patterns having one or more regions that contain a nested sub-block. In addition, the geometrical block patterns can be arranged so that the number of elements in a sub-block increases or decreases as the number of iterations increases. For example, sub-block 53 can have a 2x2 geometrical block pattern, while sub-block 54 can have a 3x3 geometrical block pattern, and sub-block 56 can have a 4x4 geometrical block pattern.

The recursive layout 52 is filled beginning with the lower right corner of the 2x2 sub-block 53 with the page p(i-2) that precedes the focus page p(i). Subsequently, the lower left corner and the upper right corner of the 2x2 sub-block 53 are filled with page p(i-3) and page p(i-4), respectively. In one embodiment, images representing pages p(i-2) through p(i-4) are displayed at one-half the resolution at which focus page p(i-1) is displayed. After filling sub-block 53 with images, the pages p(i-5) though p(i-7) of sub-block 54 are filled. After filling sub-block 54 with images having one-half the resolution of images of sub-block 52, pages p(i-8) through p(i-10) of sub-block 56 are filled with images. Depending on the resolution of display screen 32, sub-block 58 may represent pages p(i-11) through p(i-13) using a rectangle with no image data. Typically, at a certain resolution the image data no longer provides any information concerning image content. However, displaying a rectangle without image content provides contextual information relating to the length of the selected document. It will be understood by those skilled in the art that other geometrically recursive patterns besides a block, such as a rectangle or a circle, could be used to implement the present invention.

To avoid distortion caused when a physical perspective is simulated in three-dimensions, the pages of a selected document are represented using electronic images in two-dimensions with varying resolutions. Representing a document using a two-dimensional arrangement of pages at varying resolutions creates a hierarchical representation of pages. In one embodiment, each image in a nested sub-block is displayed at a single resolution while image resolution is decreased within each nested sub-block. For example, images in sub-block 53 that represent pages p(i-2), p(i-3), and p(i-4), are displayed at an equivalent resolution. However, the resolution of the images forming sub-block 53 is greater than the images forming sub-block 54. In an alternate embodiment, the images that represent pages of a selected document are displayed at a decreasing resolution as the distance from the focus page of the page being displayed increases. For example, in the alternate embodiment the images forming sub-block 53 are displayed such that the resolution of the page p(i-2) is larger than p(i-3) and the resolution of page p(i-3) is larger than p(i-4).

The dimensions of each page p(i) shown in display layout 50 is device dependent and will vary depending on the system parameters of particular computer system 26. For example, the system parameters that are used to determine the display layout 50 include the resolution of display screen 32 and the amount of memory 22 and 24. The pixels forming display screen 32 are defined by a resolution and a gray scale value. For example, pixels on a screen 32 may be arranged with a resolution of 75 pixels per inch (ppi), with each pixel having 256 different levels of gray. In addition, the display layout is defined by the physical size of the display screen 32. For instance, a larger display screen such as a 21 inch screen will be able to display a greater number of nested sub-blocks than a 12 inch display. Also, the layout of the display may depend on the aspect ratio of the display screen 32. Most display screens have an aspect ratio of 4:3 that is oriented horizontally. Other aspect ratios that are 3:4 may require that the display layout 50 be substantially rearranged.

Once calculations have been completed by display layout calculator 14, the display layout 50 shown in FIG. 3 is provided to the document display manager 18. In particular, the display layout defines the location for each page in the linear sequence 40 relative to focus page p(i). In addition, the display layout 50 defines the location and resolution of each image in the layout on the display screen 32. When a linear sequence of pages 40 is displayed, the document display manager fills the screen 32 with images in locations and at the resolutions defined by display layout 50. The display manager starts by displaying focus page p(i) and continues by displaying those pages proximate to focus page p(i) in the array of pages 50, such as neighboring pages p(i-1) and p(i+1). The display manager 18 invokes gray scale image converter 16 depending on whether a gray level image has been generated for a particular bitmap image in linear array 40.

Images of pages displayed on screen 32 are displayed as gray scale images that have been reduced from larger binary images. The display 32 is, therefore, preferably a gray scale or color display. For example, using a gray scale screen having 75 pixels per inch can represent six or seven point fonts. The gray scale image converter 16 converts binary images to gray scale images using the combination of well known resolution conversion techniques. Images are converted from one resolution to another using bit-halving and area mapping techniques. Bit-halving eliminates one bit for every two bits defining an image. Resolution conversion techniques such as area mapping are disclosed for example by Coward in "Area Mapping Table Look Up Scheme", Xerox Disclosure Journal, Vol. 18, No. 2, March/April 1993, p. 217, and by Papaconstantinou in "Hardware Architecture For Resolution Conversion Using Area Mapping", Xerox Disclosure Journal, Vol.18, No. 5, September/October 1993, p. 553.

Bitmap images that have been converted to a gray scale images are stored in lists 42 that are associated with a particular page of a selected document. The cache manager 20 arranges to have certain gray scale images in memory 23 and others on disk 24. For example, focus page p(i) is shown in FIG. 2 as having gray scale images 44, 45, 46, and 47. Although each gray scale image may have already been generated by gray scale image converter 16, only one gray scale image 44 will be in use on display 32 and cache manager 20 may be directed not to store gray scale images 45, 46, and 47 in memory 23 but instead in temporary file space on disk 24. Thus, depending on the current focus page p(i) in the linear array 40, cache manager 20 may swap gray scale images in and out of memory 23 to achieve the best performance for display system 8.

Figure 5:
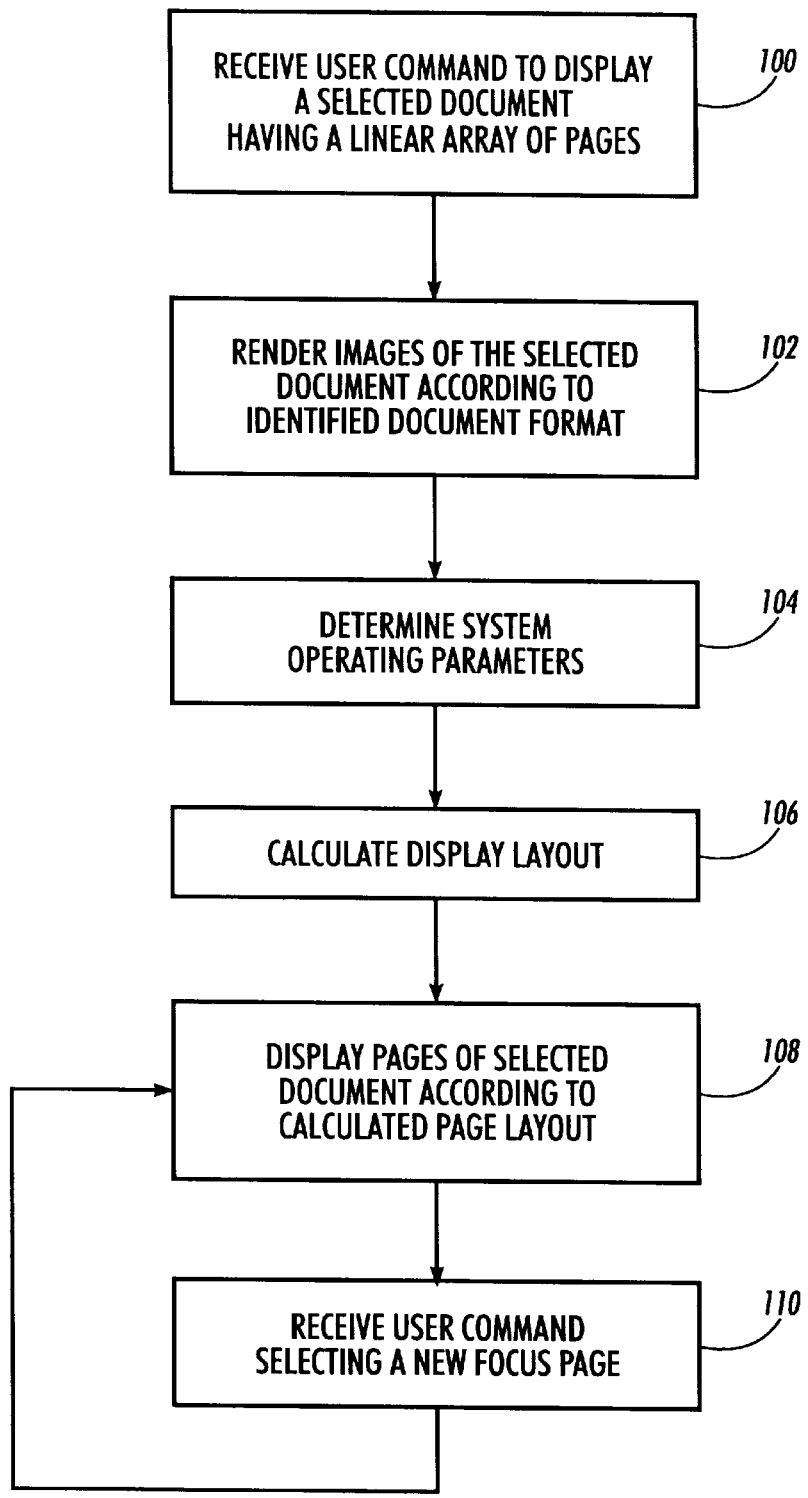
FIG. 5 is a flow diagram setting forth the steps that can be used to display a linear array of pages on a display screen in accordance with the present invention.

FIG. 5 is a flow diagram setting forth the steps that can be used to carry out the present invention. At step 100, a user command is received from a user of display system 8 from either mouse 30 or keyboard 28. In response to the user command, the document display manager selects a document stored on disk 24 to be displayed on screen 32 of computer system 26. The pages defining the document stored on disk 24 are ordered in a linear array of pages 40 (shown in FIG. 2). No other structure (e.g. hierarchical) is imposed on the document or assumed to be available. In addition, the user command may indicate to the display manager that the user has selected a focus page p(i) of the selected document. If a focus page p(i) is not indicated by the user command, the display manager assumes the first page of the document is the initial focus page p(i). In addition to indicating a focus page, a user may indicate whether manual or automatic cropping of images is desired by the user. Cropping is invoked by a user to optimize the available pixels on a display screen. Unless indicated otherwise, display manager 18 assumes that the user has not requested image cropping.

At step 102, the display manager 18 invokes bitmap image generator 12 to render bitmap images for each page of the selected document. Each rendered bitmap image is stored in the linear array of pages 40 if no image cropping was selected by a user. Alternatively, if cropping is selected by a user, the bitmap image generator 12 stores the cropped image in the linear array of pages 40. The bitmap image generator performs either automatic or manual cropping depending on the original form of the bitmap image. Automatic cropping is most useful for cropping electronically generated images and documents (e.g., postscript), while manual cropping is preferred for cropping scanned images. If automatic cropping is selected, bitmap image generator 12 eliminates white margins of the bitmap image by examining the electronic definition of the image content. Thus, automatic image cropping is able to adjust the cropping area depending on the content of an image. On the other hand, if manual cropping is selected, a fixed rectangular imageable area is defined. With manual cropping, any image content outside the fixed rectangular imageable area is cropped and does not form part of the bitmap image stored in the linear array of pages 40. Cropping bitmap images is well known as described for example in U.S. Pat. No. 5,212,568 to Graves et al., the disclosure of which is incorporated herein by reference. The signature scanning apparatus disclosed by Graves et al., enables a user to identify image cropping dimensions to eliminate the potential for imaging documents in gutter regions.

At step 104, the document display manager 18 invokes the display layout calculator 14 to determine a set of system operating parameters. This set of parameters includes information concerning the availability of system resources such as memory, temporary file space, number of available display gray levels, and screen size. At step 106, the system operating parameters determined at step 104 are used by the display layout calculator 14 to calculate a display layout for a particular computer system 26. The resulting display layout calculated at step 106 provides information to the document display manager 18 concerning the size (i.e. resolution) and position of each image of a selected document on display screen 32. The display layout defines the size and position for images in the linear array of pages 40 relative to the focus page p(i). An example of a screen layout determined by display layout calculator 14 is shown in FIG. 3.

Figure 6:
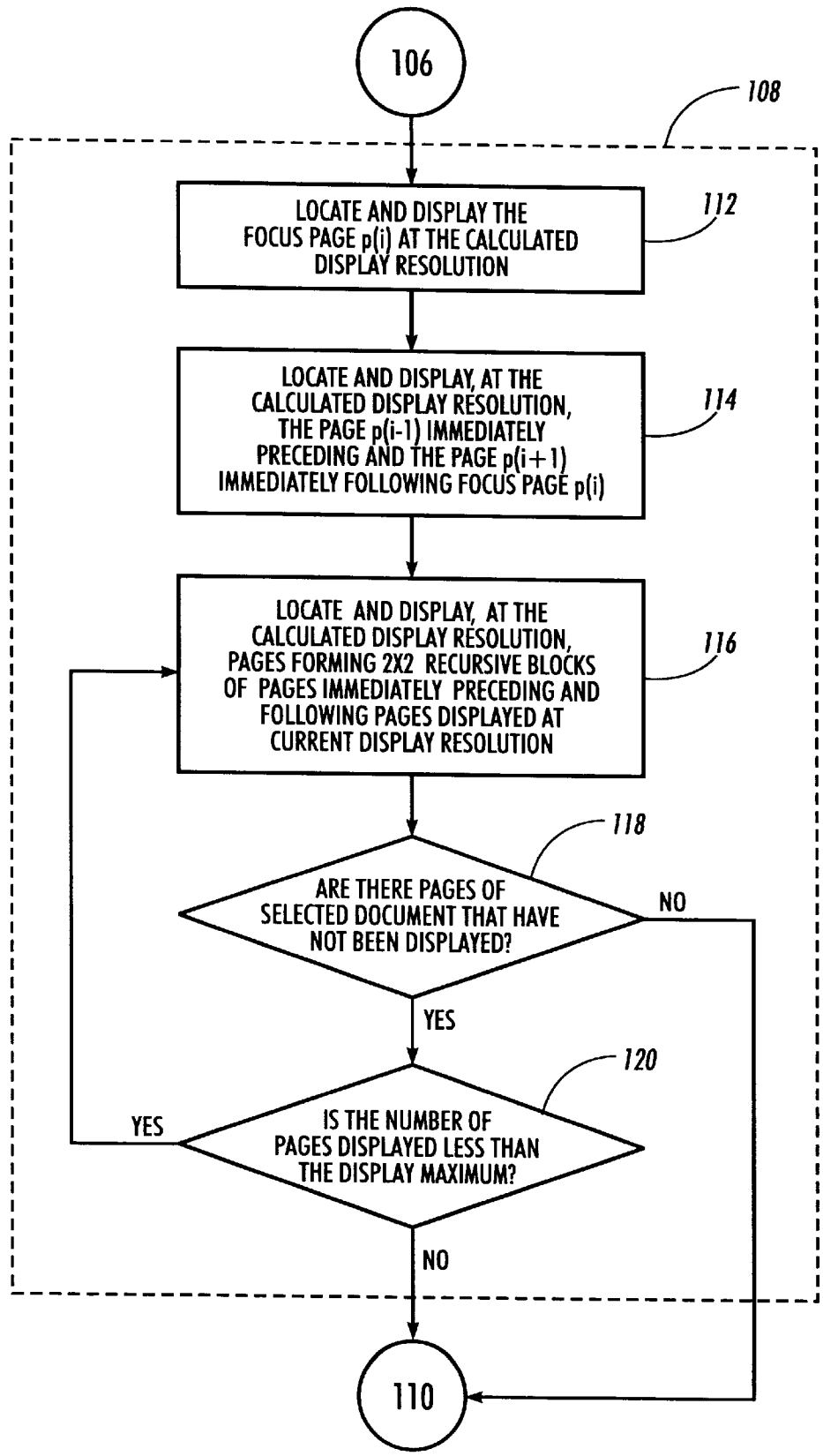
FIG. 6 is a flow diagram detailing step 108 shown in FIG. 5.

At step 108, the document display manager 18 displays pages of a selected document in accordance with the display layout calculated at step 106. Depending on the identified focus page p(i) of the selected document, display manager 18 selects images rendered to binary images at step 102 to be converted to gray scale images by gray scale image converter 16. The gray scale images are then displayed on screen 32 at positions specified by the display layout 50. The details of step 108 are shown in FIG. 6 which is discussed in detail below. Once a composite display of pages on screen 32 is complete, the display manager 18 can be interrupted by a user command from the mouse 30 or keyboard 28 by selecting a new focus page p(i), at step 110. It will be understood, however, that a user command could interrupt step 108 before step 108 has completed displaying a composite image of the pages in a document. In either case, when a user command selects a new focus page p(i) of the selected document at step 110, step 108 is repeated. Thus, in addition to providing a context in which to read a focus page p(i), displaying other pages of the selected document provides an interface with which to traverse a document.

More specifically at step 110, when a new focus page p(i) is selected, a user command is received by the document display manager 18. The user command is indicated when the mouse 30 is used to select any image displayed on screen 32. In one embodiment, the display layout 50 is used to identify which image is the new focus page p(i). Once a new focus page has been selected, the document display manager 18 shuffles the images of the pages displayed using display layout 50 according to the newly selected focus page p(i). The shuffling of the pages displayed is performed by repeating step 108, which positions the images of pages at proper resolutions (sizes) and locations defined by display layout 50.

FIG. 6 shows a flow chart detailing the steps of step 108 shown in FIG. 5. Generally, step 108 concerns the display of the pages of the selected document on display screen 32 once a display layout has been calculated at step 104 and a bitmap image for each page in the selected document has been rendered at step 102. More specifically at step 112, the focus page p(i) is located and displayed on screen 32 by document display manager 18 at the calculated resolution specified in the display layout 50. Once an image of the focus page p(i) is located at the desired resolution specified by the display layout calculated at step 106, the display manager 18 positions the image of the focus page p(i) on the display screen 32. As set forth above, the display manager 18 may either locate the image of the focus page p(i) at the desired resolution in the list of gray scale images 42 or it may invoke the gray scale image converter 16 to generate an image at the desired resolution defined by the display layout 50 shown in FIG. 3. The resolution at which the image representing the focus page p(i) is displayed is defined as the calculated display resolution in the display layout 50. The calculated display resolution for a display screen 32 is sufficiently large enough so that the image representing focus page p(i) is readily legible on the screen 32.

At step 114, the neighboring pages p(i−1) and p(i+1) immediately preceding and following focus page p(i) in the selected document are located and displayed on screen 32 as directed by document display manager 18. The resolution at which neighboring pages p(i−1) and p(i+1) are displayed is one-half the calculated resolution at which the focus page p(i) is displayed. It will be understood, however, by those skilled in the art that for the purposes of the present invention, the resolution of neighboring pages p(i−1) and p(i+1) is required only to be less than the resolution at which the focus page p(i) is displayed.

At step 116, display manager 18 continues to locate and display images representing the pages of the selected document. This step is repeated, as discussed below, until each page in the selected document is displayed unless recursive sub-blocks 51 and 52 are filled with images. The pages are displayed in an order descending from the focus page p(i) until page p(0) is displayed and in an order ascending from focus page p(i) until page p(n−1) is displayed. However, unlike the images of the pages displayed at steps 112 and 114, the remaining pages of the selected document displayed are arranged on screen 32 in accordance with recursive sub-blocks 51 and 52. Whether the recursive sub-blocks 51 and 52 are filled with images depends on the number of pages that make up the selected document and the position of the current focus page p(i) relative to the other pages in the selected document displayed.

As set forth in FIG. 4, recursive sub-block 52 is an example of the manner in which each sub-block can be generated. Specifically, the first iteration of the recursive sub-block 52 begins with sub-block 53 that is formed with a 2×2 block of images. Three of the regions, p(i−4), p(i−3), and p(i−2), in the 2×2 sub-block 52 are filled with images of pages having the same resolution (or dimensions). The other of the four regions in the 2×2 block of images is defined by sub-block 54, a second iteration of sub-block 52. With reference again to step 116, the regions defining three images in the first iteration of each sub-block 51 and 52, namely pages p(i−4), p(i−3), p(i−2), p(i+2), p(i+3), p(i+4) are located and displayed by document display manager 18 with images representing each page from the selected document.

At step 118, if there are any remaining pages of the document have not been displayed then step 110 is executed by display manager 18; otherwise step 120 is executed. At step 120, the document display manager 18 determines whether the number of pages for the selected document exceeds a display maximum. Each screen 32 has a display maximum where images displayed beyond a certain resolution do not provide any discernible image content. If there are pages in the selected document that have not been displayed and the number of pages displayed is less than the display maximum of screen 32, then the subsequent iteration of the recursive sub-blocks 51 or 52 are filled in a similar manner as the first iteration of sub-block 53 detailed at step 116. However, if the number of pages displayed by display manger 18 exceeds the display maximum, then the display manager represents the presence of an image with a rectangle without any image content defined therein.

Figure 7:
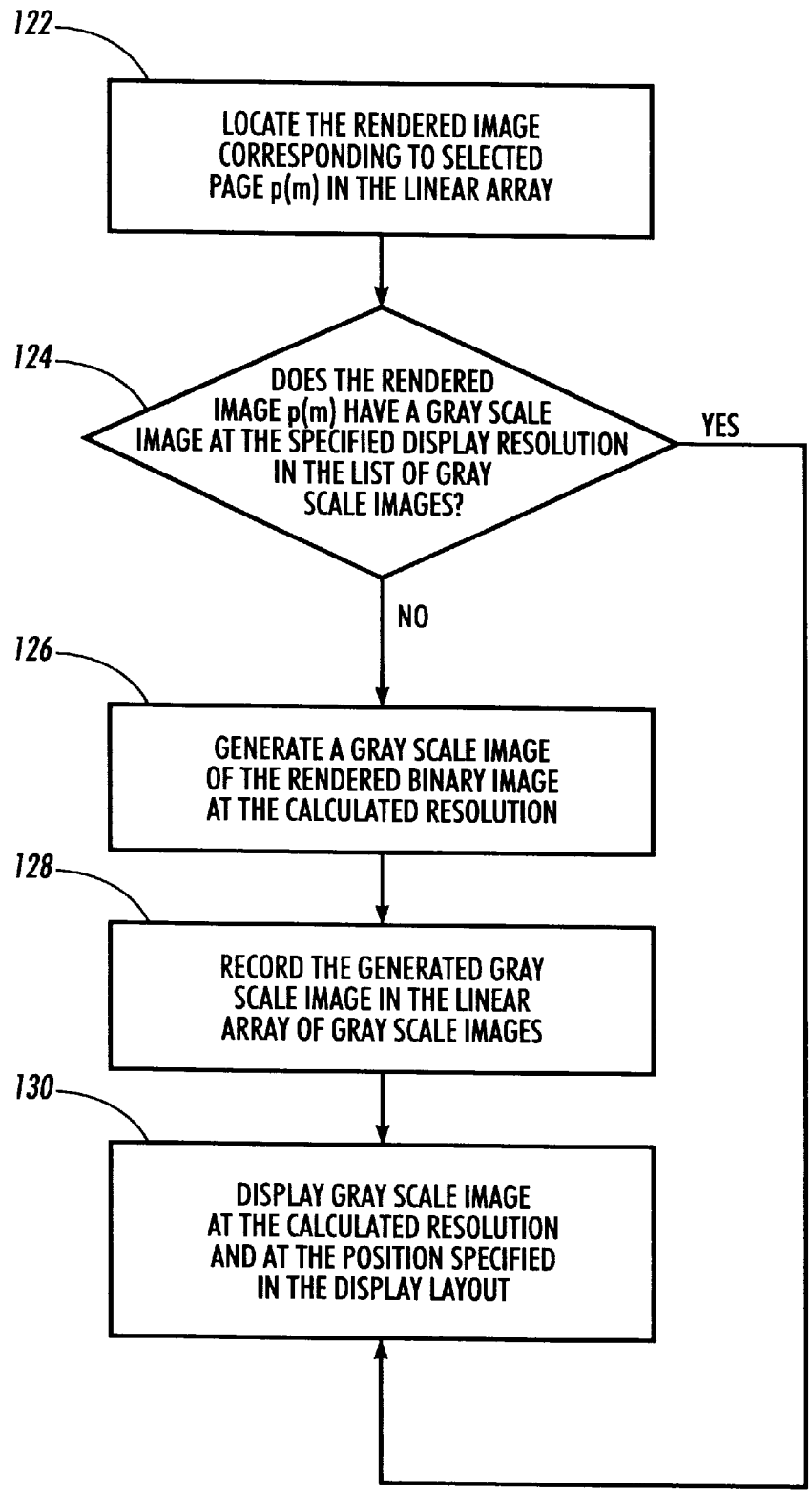
FIG. 7 is a flow diagram detailing steps for locating and displaying an image with the display system.

FIG. 7 shows the steps performed by the document display manager 18 when locating and displaying pages of a selected document at steps 112, 114, and 116 in FIG. 6. Initially at step 122, the document display manager locates a selected page p(m) in the linear array of pages 40. Once the selected page p(m) is located in the array 40, the bitmap image corresponding the current page p(m) is identified. At step 124, the document display manager 18 determines whether the rendered bitmap image has a gray scale image associated with it at the specified display resolution in the list of gray scale images 42 (shown in FIG. 2). If a gray scale image at the desired display resolution does not appear in the list of gray scale images 42, document display manager 18 invokes gray scale image converter 16 to convert the binary image (or a gray scale image having a greater resolution than the desired display resolution) to an appropriate gray scale image at step 126. Alternatively, if a gray scale image exists at the specified display resolution, then step 130 is executed. At step 128, the gray scale image generated at step 126 is recorded in the linear array of gray scale images 42 that is associated with the selected page p(m). At step 130, the gray scale image generated at step 126 is displayed on screen 32 at the position specified by the display layout 50 calculated at step 106.

Figure 8:
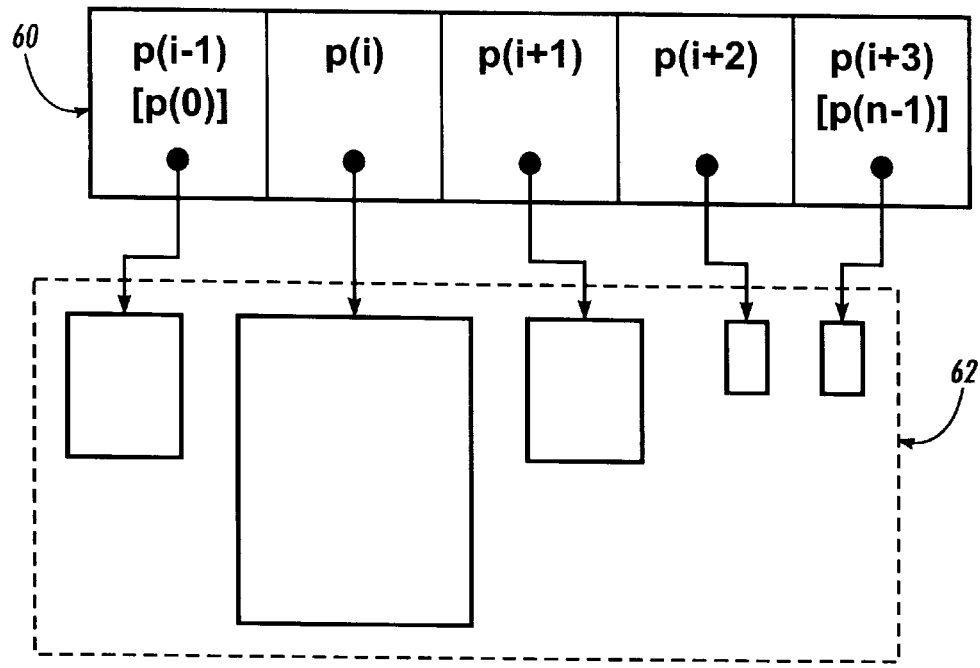
FIG. 8 illustrates an example in which the display system organizes the array of pages shown in FIG. 2 for a selected document having five pages.
Figure 9:
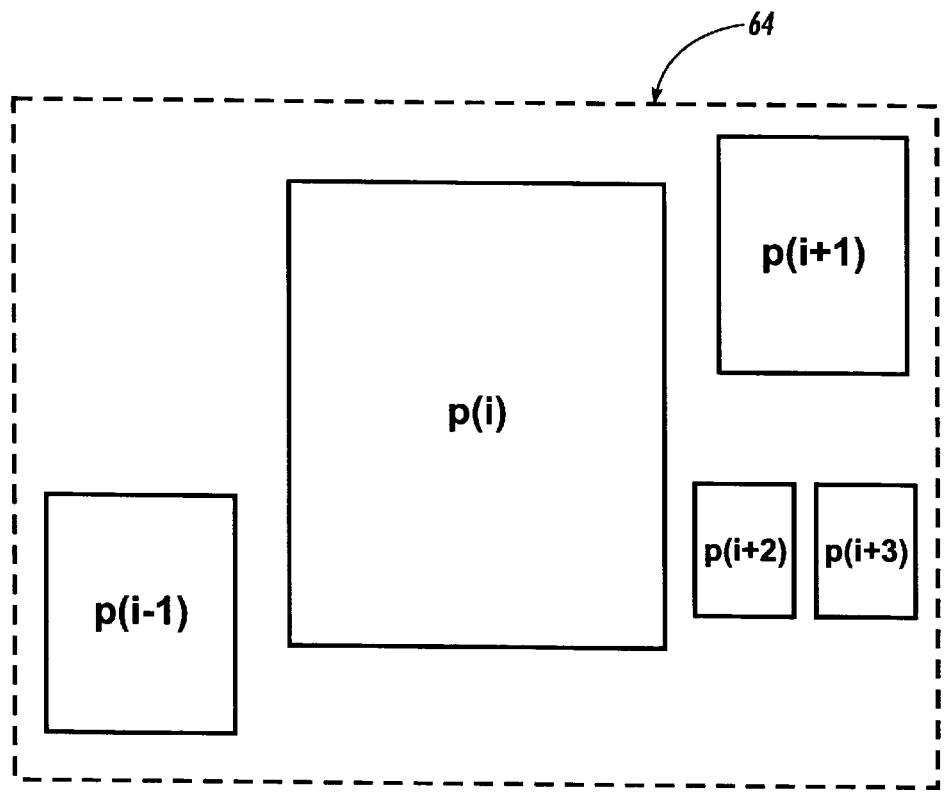
FIG. 9 illustrates an example in which the display system calculates the display layout shown in FIG. 3 for the selected document in FIG. 8.

FIGS. 8 and 9 illustrate an example of the manner in which the display system 8 organizes a selected document having five pages for display on screen 32. FIG. 8 illustrates an array of five pages 60. The array 60 begins with page p(0) and ends with page p(n−1) where n=5. The focus page p(i) is equivalent to the second page in the array of pages 60, which is the first page to be displayed on screen 32 at step 112. Subsequently at step 114, the neighboring pages immediately preceding p(i−1) and following p(i+1) focus page p(i) in the linear array of pages 60 are displayed on screen 32. Similar to the focus page p(i), document display manager 18 first attempts to locate images representing the neighboring pages p(i−1) and p(i+1) in the list of gray scale images 62, at step 124. If the images at the desired resolution for the neighboring pages p(i−1) and p(i+1) cannot be located in the list 62, the display manager 18 invokes gray scale image converter 16 to generate gray scale images at the display resolution set forth in the display layout 64. Subsequently, the remaining two images in the array 60 are displayed in a similar fashion but at the display resolution and position set forth in display layout 64.

Figure 10:
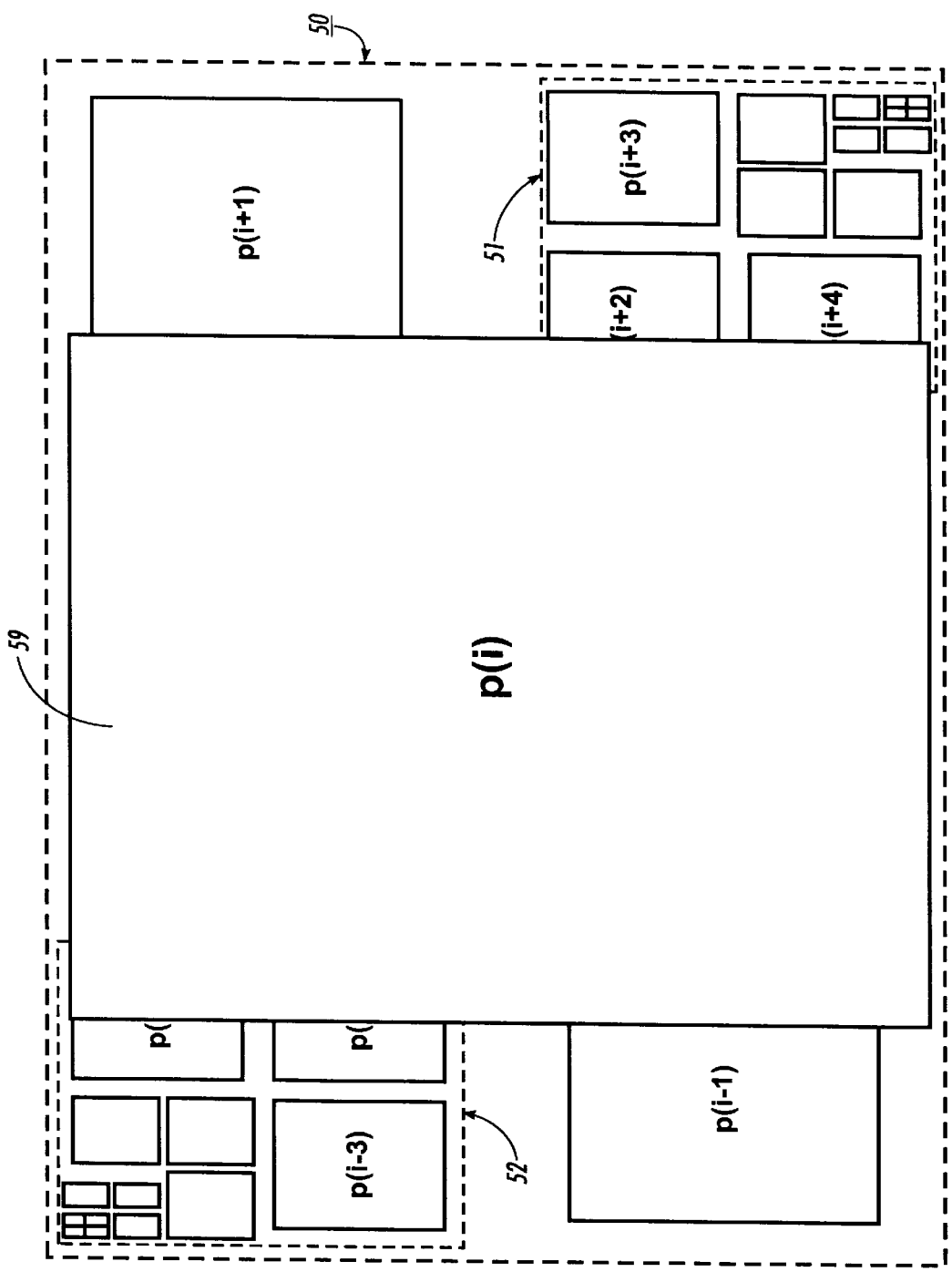
FIG. 10 illustrates a pop-up magnifier overlaying the display screen layout shown in FIG. 3.

FIG. 10 shows the document display system 8 with a pop-up magnifier 59 that permits a display page or parts of a display page to be viewed in detail (i.e., at an increased resolution). The pop-up magnifier window 59, which is generally centered on the display screen 32 over the focus page p(i), is invoked using mouse 30 to view the image of the focus page p(i) in greater detail. The pop-up magnifier 59 can exist as a mode of operation of the display system 8 to persistently display the focus page. In this mode of operation, image content of the pop-up magnifier 59 is displayed at a resolution selected by the user, such as twice the resolution of the focus page p(i). Also in this alternate mode of operation, the images adjacent to the focus page p(i) in the pop-up magnifier 59 can be selected for navigating through a document. As a user navigates through a document and selects a new focus page, the newly selected focus page is shuffled and automatically displayed in the pop-up magnifier 59. In order to facilitate navigating to other pages of a document, it is preferred that any image displayed on the screen is not entirely overlapped by the pop-up magnifier 59.

In another mode of operation, the magnifier window is displayed only while a mouse button is depressed. In yet another mode of operation, a plurality of pop-up magnifier windows, which can be individually selected by a user, can be used to display a magnified image at varying resolutions. It will be appreciated by those skilled in the art that in some instances, the screen 32 may have a resolution great enough not to require a pop-up magnifier 59 since most of the images displayed on the screen may be legible. Furthermore, it will be understood by those skilled in the art that the display system 8 can be modified to provide editing functions so that each image displayed on the screen is editable.

As shown in FIG. 10, depending on the resolution at which the pop-up magnifier displays focus image p(i), a varying number of images already displayed on the screen may be occluded from view. In FIG. 10, the focus image p(i) overlaps some of the other images displayed on the screen. However, depending on the resolution at which an image is displayed in the pop-up magnifier, the images remaining on the display screen may be tiled without being overlapped by the image p(i) displayed in the pop-up magnifier 59. Also, depending on the resolution and outlay of the display screen part of the image in the pop-up magnifier window may not fall within the visible dimensions of the screen. In the event an image in the pop-up magnifier window does not fit vertically on a screen that is horizontally oriented (or fit horizontally on a screen that is vertically oriented), a mechanism for scrolling an image in the pop-up magnifier 59 is provided to allow any part of the displayed image to be visible.

Figure 11:
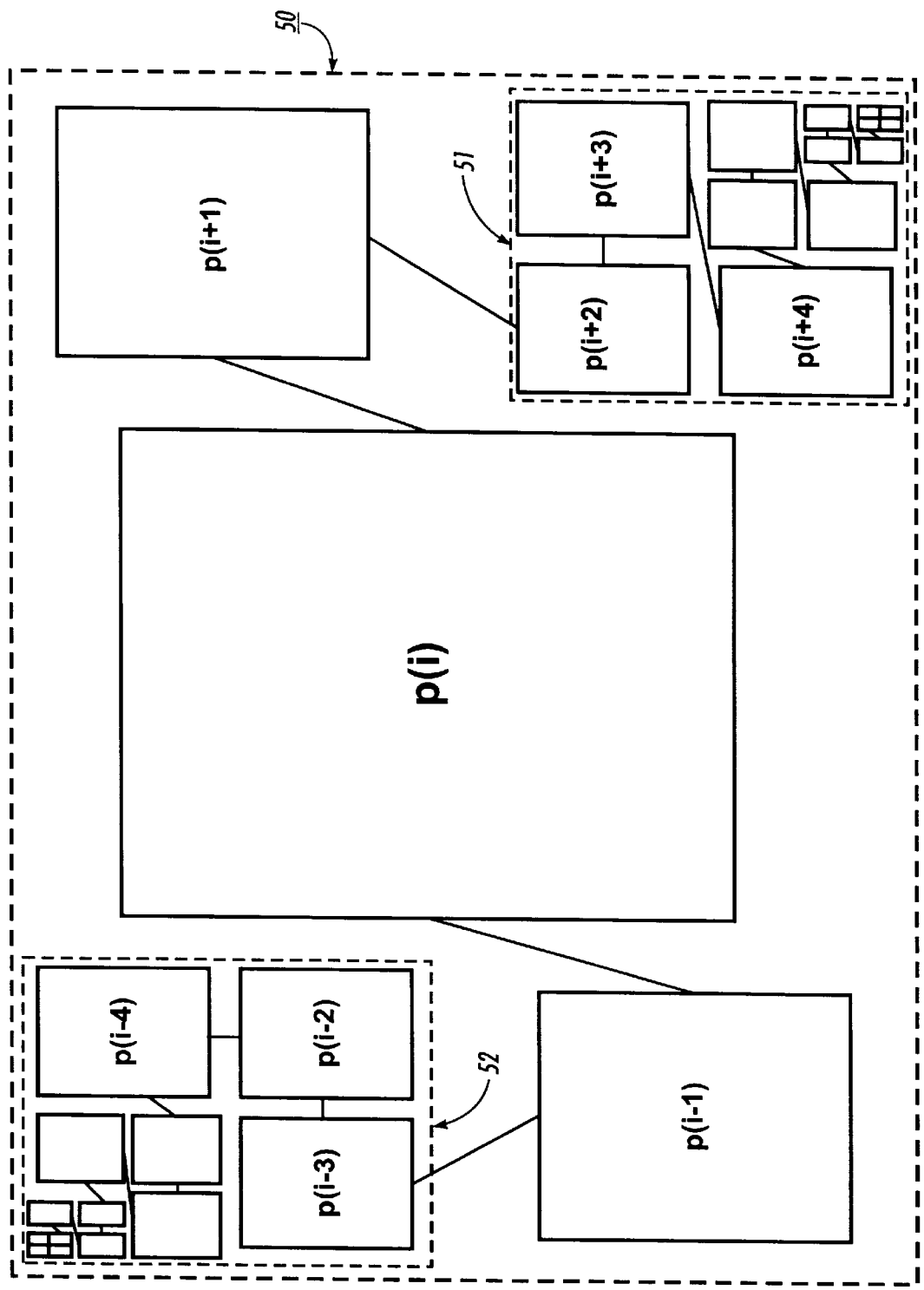
FIG. 11 illustrates an alternate embodiment of a visual indication that connects each page of a document to indicate the ordering of pages in the display screen layout shown in FIG. 3.

In yet another embodiment of the present invention, the images displayed on screen 32 are displayed with a visual indication of the ordering of the pages in the selected document. The visual indication can be selectively invoked for new users to understand the ordering of the pages of the document displayed according to display layout 50. For example, the pages of the document can be numbered or connected by lines or arrows to provide the visual indication. FIG. 11 shows a visual indication using lines that connect each page of a document displayed on screen 32. Additionally, a transition from one focus page p(i) to a different focus page p(i) can be animated to provide visual indications of page order and improve visual appearance. For example, transitions between focus pages can be animated on the display by sliding between changing image positions and zooming between changing image resolution.

In summary, the display system 8 presents a linear array of pages of a selected document on a display screen. The upper left images presented on the display screen correspond to lower numbered pages while the lower right images correspond to higher number pages. The focus page p(i), which is displayed in the center of the display screen, defines the division between the pages presented on the left and presented on the right of the display screen. All pages in the document are displayed using recursive blocks except for the focus page p(i) and the pages immediately adjacent to the focus page, namely pages p(i−1) and p(i+1). The recursive blocks are nested as far down as the resolution of a particular display screen permits. For example, thirty or more pages of an image can be displayed in a recursive block. Even though there is little useful detail concerning the content of some of the smaller images, these smaller images still provide information concerning the length of the selected document, and the general layout of a particular page such as the location of figures and text. In addition, each image representing a page on the display screen, no matter how small, can be selected to be a new focus page p(i) using a pointing device such as a mouse.

Parts of the disclosed display system 8 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method for processing images of a multi-page document with a display system, the display system including a display screen for presenting images to a user, a user input device for receiving signals indicating commands from the user, memory for storing images of the multi-page document, and a processor for receiving commands from the user input device directed at displaying the images of the multi-page document stored in the memory on the display screen, comprising the steps of:

arranging images of the multi-page document stored in the memory into an indexed array of sequentially ordered images; each image in the indexed array of sequentially ordered images having an index value that defines an offset from other images in the indexed array;

identifying an image of the multi-page document in the indexed array of sequentially ordered images; the identified image defining a focus image of the document to be displayed on the display screen;

calculating, with the processor, a two-dimensional display layout identifying a location and a resolution at which to display the images of the multi-page document on the display screen; the calculated two-dimensional display layout including the focus image, a first set of images and a second set of images; the first set of images and the second set of images having nested sub-sets of images with resolutions that intermittently decrease as the index values of images in the indexed array of images increase and decrease relative to the index value of the focus image; and displaying images in the indexed array of sequentially ordered images on the display screen in accordance with the calculated two-dimensional display layout.

2. The method according to claim 1, wherein said displaying step further comprises the step of displaying a first image in the indexed array of sequentially ordered images representing the focus image, the first image being displayed on the display screen at a first resolution and at a first location in accordance with the calculated two-dimensional display layout.

3. The method according to claim 2, wherein said displaying step further comprises the step of displaying a second image in the indexed array of sequentially ordered images representing an image immediately preceding the focus image, the second image being displayed on the display screen at a second resolution and at a second location in accordance with the calculated two-dimensional display layout.

4. The method according to claim 3, wherein said displaying step further comprises the step of displaying a third image in the indexed array of sequentially ordered images representing an image immediately following the focus image, the third image being displayed on the display screen at the second resolution and at a third location in accordance with the calculated two-dimensional display layout.

5. The method according to claim 1, wherein each image in the indexed array of sequentially ordered images is a binary image.

6. The method according to claim 5, further comprising the step of computing a gray scale image for each binary image in the indexed array of sequentially ordered images at a resolution defined by the calculated two-dimensional display layout.

7. The method according to claim 1, further comprising the step of arranging the first set of images in a geometrical block pattern.

8. The method according to claim 7, wherein the geometrical block pattern further comprises four regions, with three of the four regions having images displayed therein at a first resolution, and with a fourth region having a first nested sub-set of images displayed therein at a second resolution, where the first resolution is greater than the second resolution.

9. The method according to claim 8, wherein each of the four regions are of equal size.

10. The method according to claim 8, wherein the first nested sub-set of images includes four regions, with three of the four regions having images displayed therein at the second resolution, and with a fourth region having a second nested sub-set of images displayed therein at a third resolution, where the second resolution is greater than the third resolution.

11. The method according to claim 1, further comprising the step of cropping empty margins of images in the indexed array of sequentially ordered images.

12. The method according to claim 1, further comprising the step of identifying a set of parameters that define operating limits of the display system to perform said calculating step.

13. The method according to claim 1, further comprising the step of receiving a user signal from the user input device identifying an alternate focus image of the multi-page document.

14. The method according to claim 13, further comprising means for animating a transition to the alternate focus image of the multi-page document.

15. The method according to claim 13, further comprising the step of repeating said displaying step each time a user signal is received that identifies an alternate focus image of the multi-page document.

16. The method according to claim 1, further comprising the step of magnifying an image displayed on the display screen, said magnifying step partially occluding the first set of images with a magnified image.

17. The method according to claim 16, wherein said magnifying step magnifies the focus image displayed on the screen at an increased resolution selected by the user.

18. The method according to claim 17, further comprising the step of repeating said magnifying step each time a user signal is received that identifies an alternate focus image of the multi-page document.

19. A method for processing multi-page documents for display on a screen, comprising the steps of:

selecting a multi-page document for display from a database of multi-page documents stored in a memory, the selected multi-page document being arranged in the memory in an indexed array of sequentially ordered images; each image in the indexed array of sequentially ordered images having an index value that defines an offset from other images in the indexed array;

computing a gray scale image for each image in the sequence of images;

defining a focus image in the sequence of images;

displaying on the screen in two-dimensions a first gray scale image representing the focus image, the first gray scale image being displayed at a first resolution;

displaying on the screen in two-dimensions a second gray scale image representing an image immediately following the focus image in the indexed array of sequentially ordered images, the second gray scale image being displayed at a second resolution, where the second resolution is less than the first resolution; and displaying on the screen in two-dimensions nested sub-sets of images representing images in the indexed array of sequentially ordered images immediately following the second gray scale image, the nested sub-sets of images being displayed at resolutions less than the second resolution; the resolutions of the images in the nested sub-sets of images intermittently decreasing as the index values of images in the sequence of images increase relative to the index value of the focus image.

20. An apparatus for viewing multiple images of a multi-page document on a display screen, comprising:

a user input device for providing a user signal, the user signal identifying an image of the multi-page document positioned in an indexed array of sequentially ordered images; each image in the indexed array of sequentially ordered images having an index value that defines an offset from other images in the indexed array; the identified image defining a focus image of the multi-page document to be displayed on the screen;

a display layout calculator for calculating a two-dimensional display layout that identifies a location and a resolution at which to display each image of the multi-page document; the two-dimensional display layout including the focus image, a first set of images, and a second set of images; the first set of images and the second set of images having nested sub-sets of images with resolutions that intermittently decrease as the index values of images in the indexed array of sequentially ordered images increase and decrease relative to the index value of the focus image in the indexed array; and a processor for displaying images in the indexed array of images on the display screen in accordance with the two-dimensional display layout.

21. The apparatus according to claim 20, further comprising:

a memory for storing images;

a bitmap image generator for rendering bitmap images of the multi-page document, the rendered bitmap images being stored in said memory and ordered in the indexed array of sequentially ordered images; and a gray scale image converter for converting each bitmap image rendered by said bitmap image generator to a gray scale image, said gray scale image converter converting each bitmap image to a resolution defined in the two-dimensional display layout.

* * * * *